United States Patent
Bruls et al.

(10) Patent No.: US 11,677,924 B2
(45) Date of Patent: *Jun. 13, 2023

(54) METHOD AND SYSTEM FOR ENCODING A VIDEO DATA SIGNAL, ENCODED VIDEO DATA SIGNAL, METHOD AND SYSTEM FOR DECODING A VIDEO DATA SIGNAL

(71) Applicant: KONINKLIJKE PHILIPS N.V., Eindhoven (NL)

(72) Inventors: Wilhelmus Hendrikus Alfonsus Bruls, Eindhoven (NL); Arnaud Pierre Herve Bourge, Paris (FR)

(73) Assignee: Koninklijke Philips N.V., Eindhoven (NL)

( * ) Notice: Subject to any disclaimer, the term of this patent is extended or adjusted under 35 U.S.C. 154(b) by 113 days.

This patent is subject to a terminal disclaimer.

(21) Appl. No.: 17/124,898

(22) Filed: Dec. 17, 2020

(65) Prior Publication Data
US 2021/0105449 A1 Apr. 8, 2021

Related U.S. Application Data

(63) Continuation of application No. 14/476,230, filed on Sep. 3, 2014, now Pat. No. 10,904,509, which is a
(Continued)

(30) Foreign Application Priority Data

Sep. 24, 2007 (EP) .................... 07117057

(51) Int. Cl.
*H04N 11/04* (2006.01)
*H04N 13/00* (2018.01)
(Continued)

(52) U.S. Cl.
CPC .......... *H04N 13/161* (2018.05); *H04N 19/30* (2014.11); *H04N 19/597* (2014.11); *H04N 19/70* (2014.11);
(Continued)

(58) Field of Classification Search
None
See application file for complete search history.

(56) References Cited

U.S. PATENT DOCUMENTS 4,535,451 A 8/1985 Drupsteen
5,233,302 A 8/1993 Xiang
(Continued)

FOREIGN PATENT DOCUMENTS

EP 0838959 A3 3/1999
EP 1524859 A2 4/2005
(Continued)

OTHER PUBLICATIONS

Morvan et al: "Platelet-Based Coding of Depth Maps for the Transmission of Multiview Images"; Eindhoven University of Thechnology, The Netherlands and Logica CMG, Eindhoven, The Netherlands, 2006, pp. 1-12.
(Continued)

*Primary Examiner* — Nicholas R Taylor
*Assistant Examiner* — Ho T Shiu

(57) ABSTRACT

Video data signals are encoded such that the encoded video data signal comprises at least a primary and at least a secondary video data signal. The primary and secondary video data signal are jointly compressed. The primary video data signal is compressed in a self-contained manner, and the secondary video data signal is compressed using data from the primary video data signal. The jointly compressed video data signal is split into separate bitstreams, at least a primary bitstream comprising data for the primary video data signal
(Continued)

and at least a secondary bitstream comprising data for the secondary video data signal, whereafter the primary and secondary bitstreams are multiplexed into a multiplexed signal, and the primary and secondary signals are provided with separate codes.

13 Claims, 18 Drawing Sheets

Related U.S. Application Data continuation of application No. 12/526,665, filed as application No. PCT/IB2008/053739 on Sep. 16, 2008, now Pat. No. 8,854,427.

(51) Int. Cl.
| | | |
|---|---|---|
| H04N 13/161 | (2018.01) | |
| H04N 21/2365 | (2011.01) | |
| H04N 19/30 | (2014.01) | |
| H04N 19/88 | (2014.01) | |
| H04N 21/2343 | (2011.01) | |
| H04N 21/434 | (2011.01) | |
| H04N 21/81 | (2011.01) | |
| H04N 19/597 | (2014.01) | |
| H04N 19/70 | (2014.01) | |
| H04W 56/00 | (2009.01) | |
| H04W 52/02 | (2009.01) | |
| H04L 12/18 | (2006.01) | |
| H04W 72/04 | (2023.01) | |

(52) U.S. Cl.
CPC ......... H04N 19/88 (2014.11); H04N 21/2365 (2013.01); H04N 21/234327 (2013.01); H04N 21/4347 (2013.01); H04N 21/816 (2013.01); H04L 12/1881 (2013.01); H04W 52/0216 (2013.01); H04W 56/001 (2013.01); H04W 56/0015 (2013.01); H04W 72/04 (2013.01)

(56) References Cited

U.S. PATENT DOCUMENTS

| | | | |
|---|---|---|---|
| 5,392,071 | A | 2/1995 | Richards et al. |
| 5,612,735 | A | 3/1997 | Haskell et al. |
| 5,619,256 | A | 4/1997 | Haskell et al. |
| 5,633,682 | A | 5/1997 | Tahara |
| 5,801,781 | A | 9/1998 | Hiroshima et al. |
| 5,825,430 | A | 10/1998 | Adolph et al. |
| 5,850,352 | A | 12/1998 | Moezzi et al. |
| 6,157,412 | A | 12/2000 | Westerman et al. |
| 6,281,861 | B1 | 8/2001 | Harrold |
| 6,704,281 | B1 * | 3/2004 | Hourunranta ............ H04N 7/52 370/465 |
| 6,925,250 | B1 | 8/2005 | Oshima |
| 7,024,100 | B1 | 4/2006 | Furuyama |
| 8,340,177 | B2 | 12/2012 | Ji et al. |
| 8,483,269 | B2 | 7/2013 | Kim et al. |
| 8,854,427 | B2 | 10/2014 | Bruls et al. |
| 2002/0009137 | A1 * | 1/2002 | Nelson ................. H04N 13/211 348/E13.064 |
| 2003/0039318 | A1 | 2/2003 | Tong |
| 2003/0095177 | A1 | 5/2003 | Yun et al. |
| 2003/0115608 | A1 | 6/2003 | Armstrong et al. |
| 2004/0151394 | A1 | 8/2004 | Soderberg et al. |
| 2005/0132418 | A1 | 6/2005 | Barton et al. |
| 2005/0185712 | A1 | 8/2005 | Lee |
| 2005/0251750 | A1 | 11/2005 | Vallone et al. |
| 2005/0262539 | A1 | 11/2005 | Barton et al. |
| 2006/0059531 | A1 | 3/2006 | Fukuda et al. |
| 2006/0114993 | A1 | 6/2006 | Xiong et al. |
| 2006/0125962 | A1 | 6/2006 | Shelton et al. |
| 2006/0146138 | A1 | 7/2006 | Xin et al. |
| 2006/0146143 | A1 | 7/2006 | Xin et al. |
| 2007/0002041 | A1 | 1/2007 | Kim et al. |
| 2007/0041442 | A1 | 2/2007 | Novelo |
| 2007/0071093 | A1 * | 3/2007 | Shi .......................... H04N 19/44 375/240.03 |
| 2007/0121722 | A1 | 5/2007 | Martinian et al. |
| 2007/0183495 | A1 | 8/2007 | Kim |
| 2007/0201549 | A1 | 8/2007 | Hannuksela |
| 2007/0230921 | A1 | 10/2007 | Barton et al. |
| 2008/0124043 | A1 | 5/2008 | Honjo |
| 2008/0198920 | A1 | 8/2008 | Yang et al. |
| 2008/0301039 | A1 | 12/2008 | Dawson et al. |
| 2009/0109281 | A1 * | 4/2009 | Mashitani ............ H04N 13/139 348/E13.001 |
| 2010/0110162 | A1 | 5/2010 | Yun et al. |

FOREIGN PATENT DOCUMENTS

| | | |
|---|---|---|
| JP | 10243419 A | 9/1998 |
| JP | 1997000042675 A | 9/1998 |
| JP | 1198528 A | 4/1999 |
| JP | 1997000255353 A | 4/1999 |
| JP | 11341520 A1 | 12/1999 |
| JP | 1998000164347 A | 12/1999 |
| JP | 2002142227 A | 5/2002 |
| WO | 2003056843 A1 | 7/2003 |
| WO | 2005114998 A1 | 12/2005 |
| WO | 2006108917 A1 | 10/2006 |
| WO | 2007047736 A2 | 4/2007 |

OTHER PUBLICATIONS

Kim et al., "Comments on High-Level Syntax for MVC Contribution to the 76th MPEG Meeting", University of Southern California, International Organisation for Standardisation, ISO/IEC JTC1/SC29/WG1 M13319, 2006, 10 Pages.

Babonneau et al, Carriage of MPEG-4 SVC Over MPEG-2 Systems, International Organisation for Standardisation, ISO/IEC JTC1/SC29/WG11, M14190, 2007, 15 Pages.

Chen et al., "On MVC File Format", International Organisation for Standardisation, ISO/IEC JTC1/SC29/WG11, M14634, 2007, 3 Pages.

Gruneberg et al., "Proposal for MPEG-2 Transport Stream Extensions for Scalable Video Coding", Fraunhofer HHI Berlin, International Organisation for Standardisation, ISO/IEC JTC1/SC29/WG11, M14676, 2007, 6 Pages.

"Program-Specific Information", Wikipedia, XP055104745, Retrieved From the Internet: http://en.wikipedia.org/w/index.php?title=program-specific information&oldid=590622891 on Feb. 27, 2014.

Vetro et al, Overview of the Stereo and Multiview Video Coding Extensions of the H.264/MPEG-4 AVC Standard, Proceedings of the IEEE, vol. 99, No. 4, 2011, pp. 626-.

Schwartz et al Hierarchical B Pictures, Joint Video Team of ISO/IEC MPEG & ITU-T VCEG, Document JCT-P024, 16th Meeting, Poznam PL, Jul. 2005 p. 1-25.

ISO/IEC 14496—2005 Information Technology—Coding of Audio-Visual Objcts Part 10 Advanced Video Coding Abstract 2005.

\* cited by examiner

METHOD AND SYSTEM FOR ENCODING A VIDEO DATA SIGNAL, ENCODED VIDEO DATA SIGNAL, METHOD AND SYSTEM FOR DECODING A VIDEO DATA SIGNAL

This application is a continuation of prior U.S. patent application Ser. No. 14/476,230 filed Sep. 3, 2014 which is a continuation of U.S. patent application Ser. No. 12/526,665, filed Jan. 4, 2010, which is a National Stage Application of PCT/IB2008/053739, filed Sep. 16, 2008, and which claims the benefit of European Patent Application No. 07117057.5, filed Sep. 24, 2007, the entire contents of each of which are incorporated herein by reference thereto.

The invention relates to the field of video encoding and decoding. It presents a method and system for encoding a video data signal. The invention also relates to an encoded video data signal. The invention also relates to a method for decoding and a system for decoding a video data signal.

Recently there has been much interest in providing increased video possibilities, for instance 3-D images on 3-D image displays. It is believed that 3-D imaging will be, after color imaging, the next great innovation in imaging. We are now at the advent of introduction of auto-stereoscopic displays for the consumer market.

Basically, a three dimensional impression can be created by using stereo pairs, i.e. two slightly different images directed at the two eyes of the viewer.

Whatever type of display is used, the 3-D image information has to be provided to the display device. This is usually done in the form of a video data signal comprising digital data, often comprising data for a left and a right view or for a number of views, when multiple views are generated.

Another example of increased video possibilities is providing a video data signal capable of providing high frequency video, for instance video with double the standard frame display frequency.

Yet another example is providing a video data signal of enhanced resolution.

Because of the massive amounts of data inherent in digital imaging, the processing and/or the transmission of digital image signals form significant problems. In many circumstances the available processing power and/or transmission capacity is insufficient to process and/or transmit high quality video data signals. More particularly, each digital image frame is a still image formed from an array of pixels. This problem exists for all video but is increased for 3D video imaging, and the same increase in problem occurs when a video data signal of double frequency is to be generated or a video data signal of enhanced resolution is to be generated.

The amounts of raw digital information are usually massive requiring large processing power and/or or large transmission rates which are not always available. Various compression methods have been proposed to reduce the amount of data to be transmitted, including for instance MPEG-2, MPEG-4 and H.263.

The known compression methods have originally been set up for standard 2D images.

If for instance 3D information is generated at the acquisition side, this information needs to be transmitted and in order to have a low extra overhead in terms of bit rate, compression of 3D information is required. Preferably the compression (or encoding) of the 3D information is performed in such a manner that compression of 3D information can be implemented using existing compression standards with only relatively small adjustments. When the video data signal is enhanced in the sense that it comprises information on the double frequency signal or enhanced resolution the same applies.

Furthermore the improved video signal is preferably backwards compatible, i.e. a conventional standard video apparatus should preferably be able to display a "good" video image from the improved video signal. For instance the 3D stereo signal is preferably 2D backwards compatible, i.e. a conventional 2D apparatus should preferably be able to display a "good" 2D image from the 3D signal. A high frequency 100 Hz video data signal should be able to be displayed on a standard 50 Hz video apparatus even if the apparatus is itself not capable of displaying 100 Hz signals. Likewise a video data signal of enhanced resolution (HDTV, High Definition TV) should be able to be displayed on a standard TV apparatus.

Simply compressing a stereo image as two separate leads to a large increase in bit rate. Encoding separately the left (L) and right (R) views of a stereo pair practically leads to doubling the bit-rate compared to a mono system (one single view) if one wants to guarantee the same quality. Thus such a method, although ensuring that a 2D device can display an image, requires doubling of the bit-rate.

The amount of data increases even more when use is made of a multiview system wherein more than two views are generated.

The same applies when a video data signal is enhanced by including information on higher frequency video data signals. Double the frequency would double the data. Increasing the resolution will create the same problem.

A better method, in regards to coding efficiency, is to jointly compress the two stereo (left and right) or more views or jointly compress high frequency and low frequency video data signals or jointly compress low resolution and high resolution video data signals. This solution, for a left and right frame, typically leads when two views are jointly compressed to using 50% more bandwidth than the single-view case (to be compared to ~100% more bandwidth in the case of separate view coding). This can be achieved using conventional 2D video compressing encoders by interleaving Left and Right frames from each stereo view to form a "fake" 2D sequence. At the retriever side, the 2D frames are de-interleaved and each view is retrieved and displayed. For instance the 2 views (L and R) can be interleaved as frame pictures before entering a video encoder.

However, although using standard techniques for instance for stereo video can be more (1.5*gain) efficiently compressed jointly than compressing the separate views and the resulting bit-stream could be displayed on a suitable 3D device, the inventors have realized that the result is one single bit-stream which cannot be displayed on a normal 2D system with good results. When the single interleaved bit-stream reaches a conventional 2D receiver (with a 2D decoder and a 2D screen), the displayed video sequence would look ugly showing visible imperfections as it results from the interleaving of a stereo one. This method is thus not backwards compatible. The same holds for multiview signals or other improved video data signals which are jointly compressed.

It is thus an object of the invention to provide a method for encoding enhanced image data at the transmission side which does offer backward compatibility while keeping the amount of data within the encoded data in bounds. Preferably the coding efficiency is large. Also, preferably, the method is compatible with existing encoding standards.

It is a further object to provide an improved encoder for encoding a video data signal and a video data signal.

To this end a method for encoding video data signals in accordance with the invention is a method wherein a video data signal is encoded, the encoded video data signal comprising at least a primary and at least a secondary video data signal, wherein the primary and secondary video data signal are jointly compressed, the primary video data signal being compressed in a self-contained manner, and the secondary video data signal being compressed using data from the primary video data signal, the jointly compressed video data signal is split into separate bitstreams, the bitstreams comprising at least a primary bitstream comprising data for the primary video data signal and at least a secondary bitstream comprising data for the secondary video data signal, whereafter the primary and secondary bitstreams are multiplexed into a multiplexed signal, and the primary and secondary signals are provided with separate codes.

The method of the invention combines the advantages of prior methods while avoiding their respective drawbacks. It comprises jointly compressing two or more video data signals, followed by splitting the single compressed bitstream into 2 or more (primary and secondary) separate bit-streams: a "primary" one that is self contained and is decidable by conventional video decoders, and one or more "secondary" set of frames (so called auxiliary-video-representation streams) that are dependent on the primary bit-stream. The separate bitstreams are multiplexed wherein the primary and secondary bit-streams are separate bitstreams provided with separate codes and transmitted. Prima facie it may seem superfluous and a waste of effort to first jointly compress signals only to split them again after compression and provided them with separate codes. In all known techniques the compressed video data signal is given a single code in the multiplexer. Prima facie the invention seems to add an unnecessary complexity in the encoding of the video data signal.

The inventors have however realized that splitting and separately packaging (i.e. giving the primary and secondary bitstream separate codes in the multiplexer) of the primary and secondary bit stream in the multiplexed signal has the result that, on the one hand, a standard demultiplexer in a conventional video system will recognize the primary bit stream by its code and send it to the decoder so that the standard video decoder receives only the primary stream, the secondary stream not having passed the de-multiplexer, and the standard video decoder is thus able to correctly process it as a standard video data signal, for instance a standard 2D video data signal and/or a standard 50 Hz video data signal, or a signal of base resolution while on the other hand, a specialized system such as a 3D system or a 100 Hz display system or a high resolution video decoder can completely reverse the encoding process and re-create the original enhanced bit-stream before sending it to the for instance a stereo decoder or 100 Hz decoder or a HTV decoder.

Many allegedly backwardly compatible systems and methods inherently require some kind of adaptation to be made to conventional video systems for properly analyzing an incoming bitstream and without such adaptation a proper decoding is difficult or impossible. The inventors have realized that the root of the problem is that the conventional decoder receives the enhanced video data signal for which it is not equipped. Even with adaptations to the decoder problems may occur simply because the decoder receives the enhanced signal (and thus more bits than usual) and might not be able to cope with the enhanced signal simply because it cannot handle the increased bit rate. Any adaptation to a standard decoder would also have to be specific for the particular enhancement (3D, 100 Hz, high resolution) to the video data signal, which might not work for other enhancements or even deteriorate the operation when a non-enhanced video data signal is received.

In the invention the primary and secondary bitstreams are separate bitstreams wherein the primary bitstream is a self-contained bitstream. This allows giving the primary bitstream a code corresponding to a standard video data signal while giving the secondary bitstream or secondary bitstreams codes not recognizable by standard demultiplexers as a standard video data signal. At the receiving end standard demultiplexing devices will recognize the primary bitstream as a standard video data signal and pass it on to the video decoder. The standard demultiplexing devices will reject the secondary bit-streams, not recognizing them as standard video data signals. The video decoder itself will only receive the "standard video data signal". The amount of bits received by the video decoder itself is thus restricted to the primary bit stream which is self contained and in the form of a standard video data signal and is interpretable by standard video devices and having a bitrate which standard video devices can cope with The video decoder is not overloaded with bits it can handle.

Since the primary bitstream is self-contained the standard video decoder can decode this into a standard decoded video data signal.

The invention can be embodied in various ways. In embodiments, particular useful for 2D-3D or for normal frequency-high frequency use, video frames are interleaved in the encoder or the encoder is provided with interleaved signals.

In such embodiments the method for coding is characterized in that a video data signal is encoded, the encoded enhanced signal comprising a first and at least a second set of frames, wherein the frames of the first and second set are interleaved to form an interleaved video sequence, or in that an interleaved video data signal comprising a first and second set of frames is received, wherein the interleaved video sequence is compressed into a compressed video data signal, wherein the frames of the first set are encoded and compressed without using frames of the second set, and the frames of the second set are encoded and compressed using frames of the first set, and whereafter the compressed video data signal is split into a primary and at least a secondary bit-stream each bit-stream comprising frames, wherein the primary bit-stream comprises compressed frames for the first set, and the secondary bit-stream for the second set, the primary and secondary bit-streams forming separate bit-streams, whereafter the primary and secondary bitstreams are multiplexed into a multiplexed signal, the primary and secondary bitstream being provided with separate codes.

In this embodiment, as in the invention in its broadest sense, the single compressed bitstream is split into 2 or more (primary and secondary) separate bit-streams: a "primary" one that fully contains only one of the sets of frames (and thus is self-contained) and is decidable by conventional video decoders, and one or more "secondary" set of frames (so called auxiliary-video-representation streams) that are dependent on the primary set of frames. The frames are interleaved at the system level or are provided to the system in an interleaved format and multiplexed wherein the primary and secondary bit-streams are separate bitstreams provided with separate codes and transmitted.

An important requirement is that after the interleaving at least one set, namely the set of frames of the primary bit-stream, is compressed as a "self-contained" signal. This means that the frames belonging to this self-contained set of frames do not need any info (e.g. via motion compensation, or any other prediction scheme) from the other secondary bitstreams.

An important aspect is also that the primary and secondary bitstreams form separate bitstreams and are multiplexed with separate codes for reasons explained above.

In embodiments the primary bitstream comprises data for frames of one of the view of a 3D video data signal, the secondary bitstream comprises data for frames of the other view of the 3D video data signal.

In embodiments the primary bitstream comprises data for frames of one of a three of more views, and more than one secondary bitstream is generated, the secondary bitstreams comprising data for frames of one of the other views.

In embodiments the primary bitstream comprises data for a low frequency set of frames, while the secondary bitstream comprises data for higher frequency frames. In embodiments the primary bitstream is compressed with a lower quantization factor than the secondary bitstreams.

When the primary and secondary bit-stream present two stereo views, the primary bit-stream may represent either of the two views, left or right.

In embodiments the designation as to which view is the view corresponding to the primary bit-stream could change. For instance, at a scene change the primary view could change from left to right or vice versa. This could be advantageous especially if the primary view is compressed with a quantization factor different from the secondary view.

The invention is also embodied in a encoding system for encoding a video data signal, comprising a generator for generating or a receiver for receiving at least a primary and a secondary video data signal, a compressor for jointly compressing the primary and secondary video data signal, the compressor being arranged for compressing the primary video data signal in a self-contained manner, and for compressing the secondary video data signal using data from the primary video data signal, a splitter for splitting the jointly compressed video data signal into separate bitstreams, a primary bitstream comprising data for the primary video data signal and a secondary bitstream comprising data for the secondary video data signal, and a multiplexer for multiplexing the primary and secondary bitstreams into a multiplexed signal, and for providing the primary and secondary signals with separate codes.

An encoding system in accordance with an embodiment of the invention comprises an interleaver (VI) for interleaving frames from a first and a second view to form an interleaved video sequence, or the encoding system comprises a receiver for receiving an interleaved video sequence comprising a first and second set of frames, the encoding system comprising an encoder for encoding the interleaved video sequence, wherein the encoder comprises a compressor for compressing the frames of the first of the views without using frames of the second view, and for compressing the frames of the second view using frames of the first view, and the system comprising a splitter for splitting the compressed video data signal into a primary and a secondary bit stream, each bit stream comprising frames, wherein the primary bit-stream comprises compressed frames for the first set, and the secondary bit-stream for the second set, the primary and secondary bitstream forming separate bitstreams, the encoding system further comprising a multiplexer for multiplexing the primary and secondary bitstreams, and for providing the primary and secondary bit-stream with separate codes.

Preferably the compressor is arranged for compressing frames on a hierarchical scheme, wherein the higher levels correspond to frames of the first of the views, and the lower or lowest level to frames of the second view.

In embodiments the encoding system is arranged for providing a primary bitstream comprising data for frames of one of the view of a 3D video data signal, the secondary bitstream comprising data for frames of the other view of the 3D video data signal.

These and further aspects of the invention will be explained in greater detail by way of example and with reference to the accompanying drawings, in which.

Figure 15:
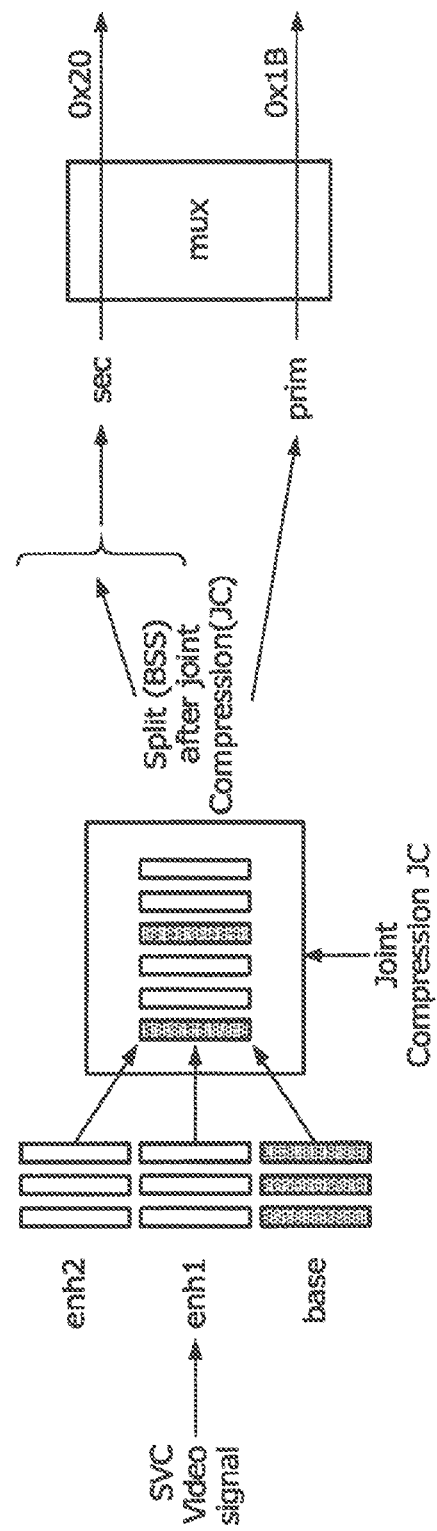
Figure 16A:
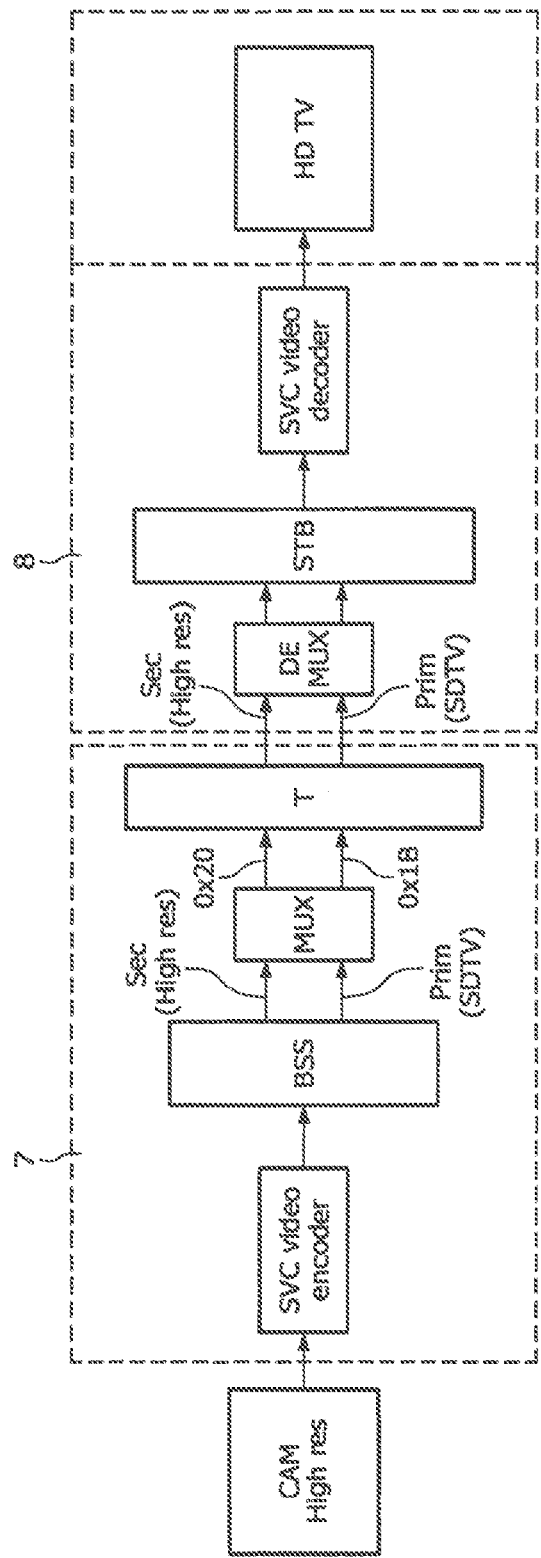

FIGS. 15, 16A and 16 B illustrate an embodiment of the invention for high resolution video.

The Figures are not drawn to scale. Generally, identical components are denoted by the same reference numerals in the Figures.

Figure 1:
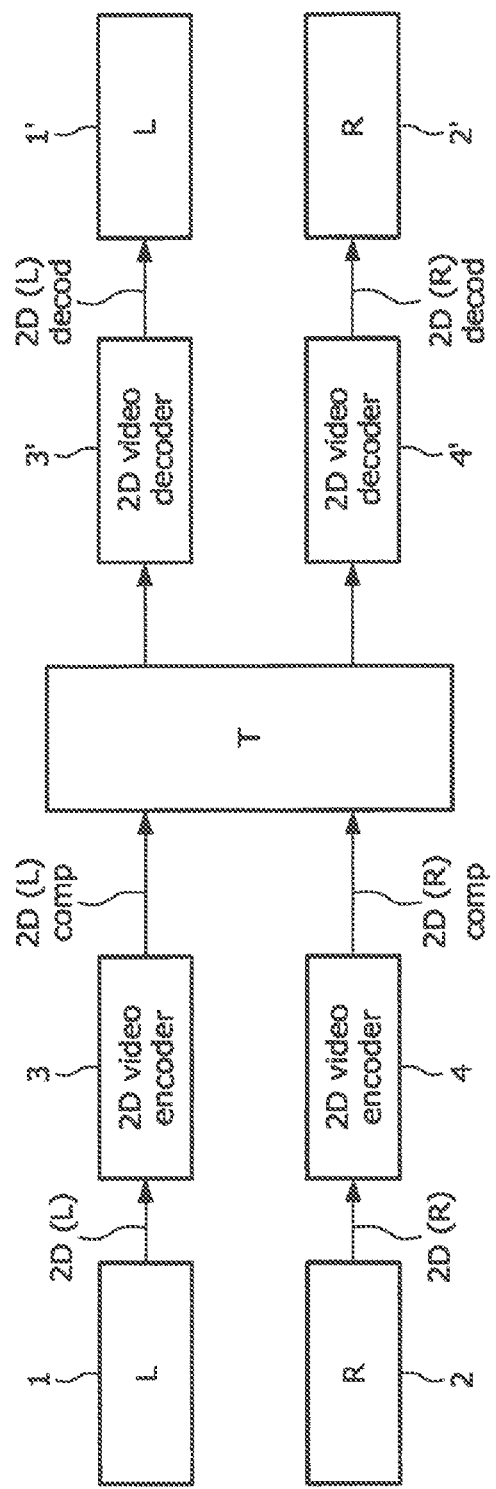
FIG. 1 illustrates an example of a prior art encoding method for 3D video.

FIG. 1 illustrates compression of video information wherein both views are separately treated and compressed. The left (L) and right (R) view video data signals 1 and 2 are each provide two substantially two dimensional images 2D(L) and 2D(R). Both of these signals are encoded and compressed in standard 2D video encoders 3 and 4. The two signals are transmitted, schematically indicated by T in FIG. 1, and received at the receiver side. The receiver decodes the two signals using 2D video decoders 3' and 4' and provides two 2D signals 1' and 2'. These two signals are then ready to be combined in a 3D video display for providing a 3D image. Any 2D video display devices can simply operate using either the left or right view. Although this scheme works, encoding separately the left (L) and right (R) views of a stereo pair practically leads to doubling the bit-rate compared to a mono system (one single view) if one wants to guarantee the same quality. Thus this standard method, although ensuring that a 2D device can display an image, requires doubling of the bit-rate.

Figure 2:
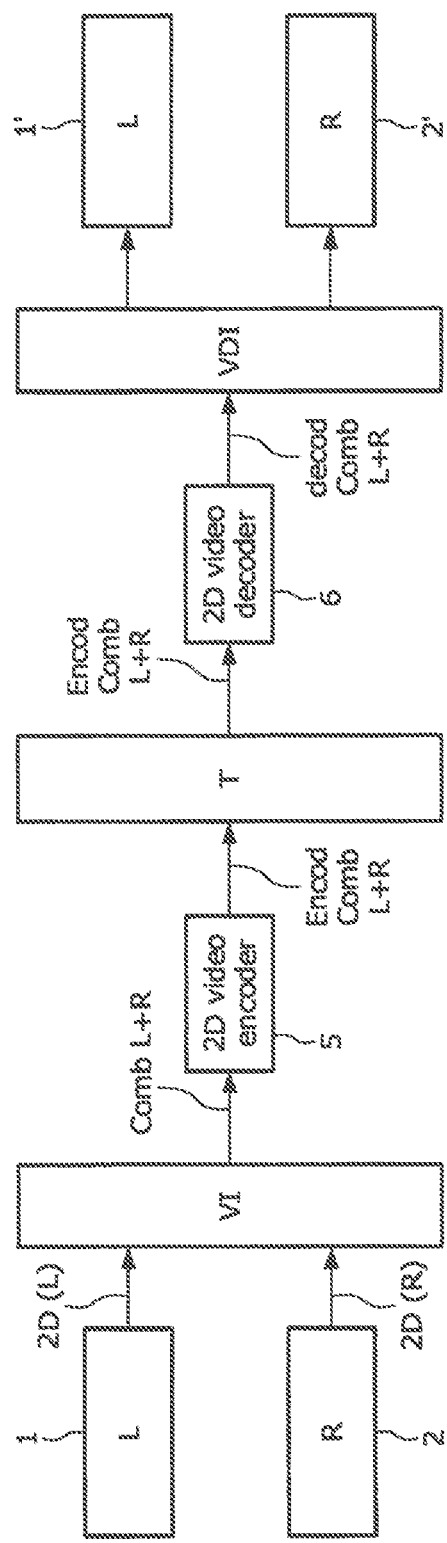
FIG. 2 illustrates a, from the point of view of coding efficiency, improved method.

FIG. 2 illustrates a, form the point of view of coding efficiency, improved method. Prior to encoding the frames of the two views are interleaved in view interleaver VI to provide a combined L+R video data signal. The interleaving provides for a combined signal resembling 2 standard 2D signal. Said signal can be compressed using conventional 2D video compression in a 2S video encoder 5. This compressed signal can then be transmitted. At the receiver side the compressed signal is decompressed in a 2D video decoder 6 and de-interleaved using a de-interleaver VDI. For instance the 2 views (L and R) can be interleaved as frame pictures before entering the video encoder 5. Hence depending on the temporal reference picture used to predict a given macroblock (MB), the prediction can be either "really" temporal (different times from the same view) or from the other view. This mechanism can be signaled through a so-called "Stereo Video Information" SEI message, to contain information on the performed interleaving so that a stereo decoder at the receiving end is able to distinguish one view from another and perform de-interleaving.

Although such a method does reduce the bit-rate (by about 25% compared to the method of FIG. 1) if the single encoded stream reaches a conventional 2D receiver (with a 2D decoder and a 2D screen) the displayed video sequence would look ugly as it results from the interleaving of a stereo one. The problem exists even in the case of AVC (Advanced Stereo Coding) with the "Stereo Video Information" SEI message. Indeed, the usage of SEI messages is not mandatory and a compliant decoder can perfectly ignore them. The single bit-stream from the method of FIG. 2 cannot be correctly played on a normal 2D display system, which is a big disadvantage. The method of FIG. 2 is thus not 2D backward compatible. A lack of 2D backward compatibility will greatly discourage people from using 3D video data signals and systems, since the overwhelming majority of displays will, at least during introduction of 3D video, be and remain standard 2D video devices. New methods are preferably backward compatible, i.e. the standard video devices should be able to cope with signals generated by new methods.

The object of the invention is therefore to provide a method which, on the one hand reduces the bit rate compared to fully and separately encoding both views, while, on the other hand, still being having standard video backward compatibility.

To this end a method for encoding video data signals in accordance with the invention is a method wherein a video data signal is encoded, the encoded video data signal comprising at least a primary and at least a secondary video data signal, wherein the primary and secondary video data signal are jointly compressed, the primary video data signal being compressed in a self-contained manner, and the secondary video data signal being compressed using data from the primary video data signal, the jointly compressed video data signal is split into separate bitstreams, the bitstreams comprising at least a primary bitstream comprising data for the primary video data signal and at least a secondary bitstream comprising data for the secondary video data signal, whereafter the primary and secondary bitstreams are multiplexed into a multiplexed signal, and the primary and secondary signals are provided with separate codes.

The method of the invention combines the advantages of prior methods while avoiding their respective drawbacks. It comprises jointly compressing two or more video data signals, followed by splitting the single compressed bitstream into 2 or more (primary and secondary) separate bit-streams: a "primary" one that is self contained and is decidable by conventional video decoders, and one or more "secondary" set of frames (so called auxiliary-video-representation streams) that are dependent on the primary bitstream. The separate bitstreams are multiplexed wherein the primary and secondary bit-streams are separate bitstreams provided with separate codes and transmitted. Prima facie it may seem superfluous and a waste of effort to first jointly compress signals only to split them again after compression and provided them with separate codes. In all known techniques the compressed video data signal is given a single code in the multiplexer. Prima facie the invention seems to add an unnecessary complexity in the encoding of the video data signal.

The inventors have however realized that splitting and separately packaging (i.e. giving the primary and secondary bitstream separate codes in the multiplexer) of the primary and secondary bit stream in the multiplexed signal has the result that, on the one hand, a standard demultiplexer in a conventional video system will recognize the primary bit stream by its code and send it to the decoder so that the standard video decoder receives only the primary stream, the secondary stream not having passed the de-multiplexer, and the standard video decoder is thus able to correctly process it as a standard video data signal, for instance a standard 2D video data signal and/or a standard 50 Hz video data signal, or a signal of base resolution while on the other hand, a specialized system such as a 3D system or a 100 Hz display system or a high resolution video decoder can completely reverse the encoding process and re-create the original enhanced bit-stream before sending it to the for instance a stereo decoder or 100 Hz decoder or a HTV decoder.

In an embodiment of the method of the invention a video data signal is encoded, the encoded video data signal comprising a first and at least a second view having frames, wherein the frames of the first and second view are interleaved to form an interleaved video sequence, whereafter the interleaved video sequence is compressed, wherein the frames of the first of the views are encoded and compressed without using frames of the second view, and the frames of the second view are encoded and compressed using frames of the first view, and where the compressed enhanced video data signal is split into a primary and a secondary bit stream each bit stream comprising frames, wherein the primary bit-stream comprises compressed frames for the first of the views, and the secondary bit-stream for the second of the views, the primary and secondary bit-stream forming separate bit-streams, whereafter the primary and secondary bit-stream are multiplexed into a multiplex signal, the primary and secondary bitstream being provided with separate codes.

Figure 3A:
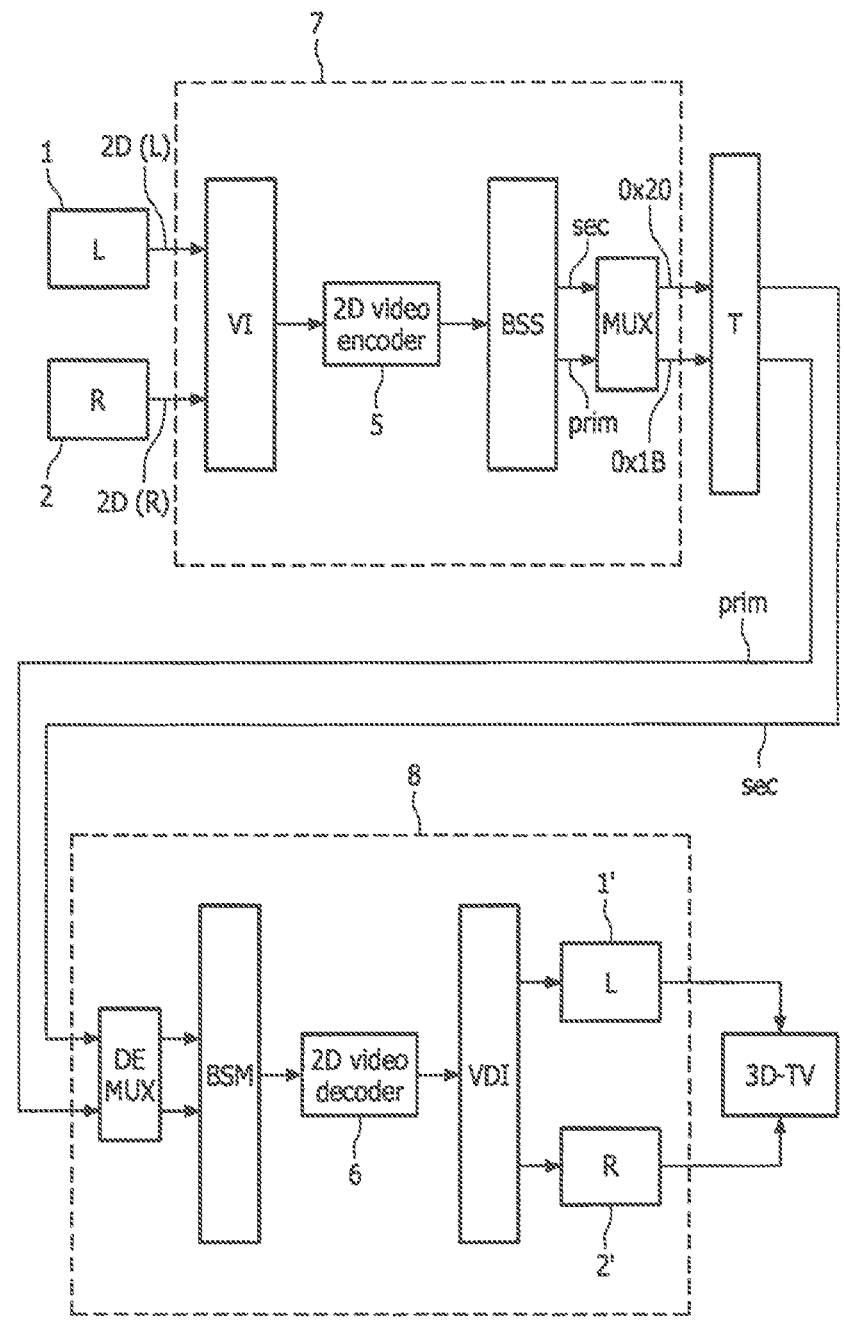
FIGS. 3A and 3B illustrate the method for encoding and the method for decoding and an encoder and decoder of the invention.
Figure 3B:
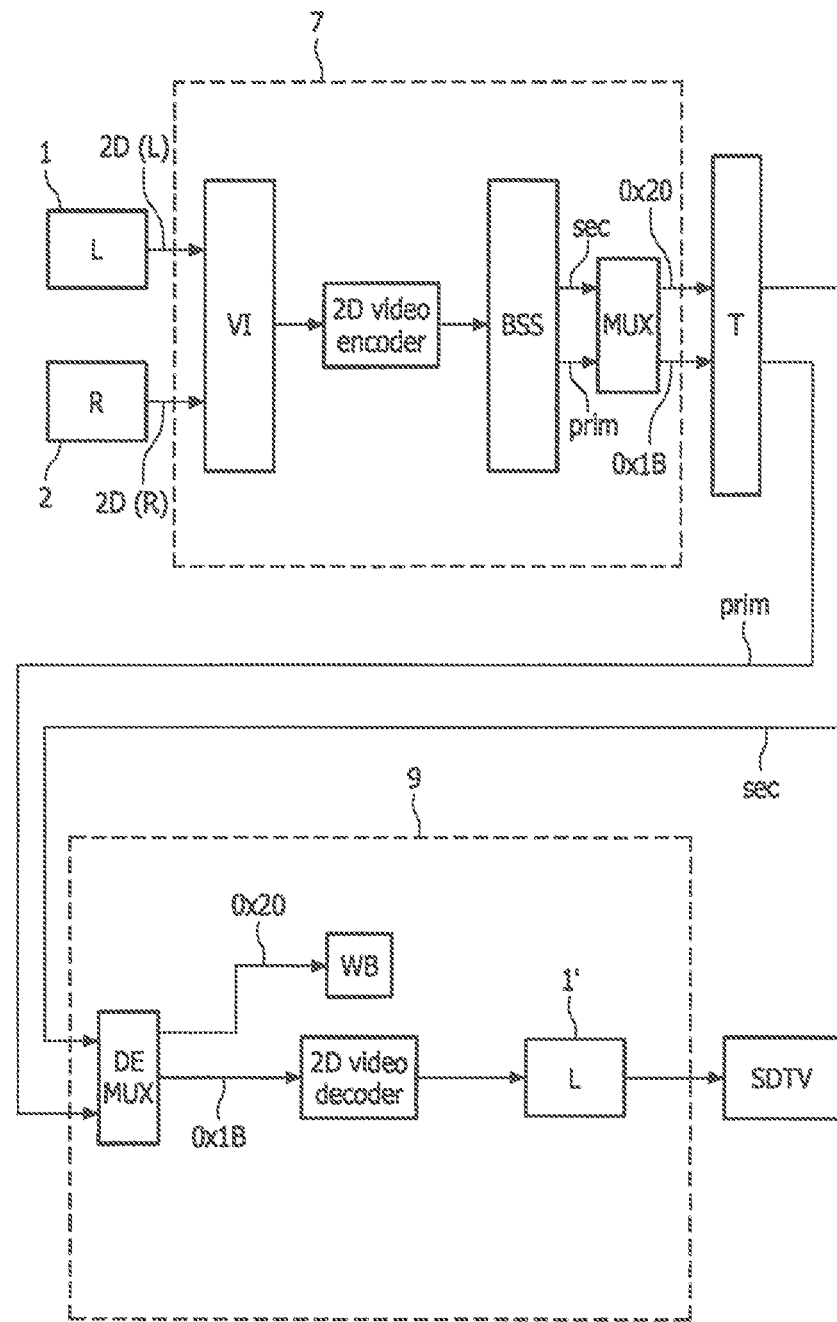

FIGS. 3A and 3B illustrate the method and an encoding system and decoding system of the above embodiment of the invention. FIG. 3A illustrate a situation wherein the encoding system 7 of the invention and a decoding system 8 of the invention is used, features of the encoding and decoding system being schematically being shown by the elements in the dotted rectangles. FIG. 3B illustrates a situation wherein a standard decoder is used.

The frames of the left and right view are interleaved in VI to provide a combined signal. The combined signal resembles a 2D signal. The 2D video encoder 5 encodes and compresses the combined interleaved signal. A special feature of the compression is that the frames of one of the views form a self-contained system, i.e. in compression no information from the other view is used for the compression. The frames of the other view are compressed using information from frames of the first view. The invention departs from the natural tendency to treat two views on an equal footing. In fact, the two views are not treated equally during compression. One of the views becomes the primary view, for which during compression no information is used form the other view, the other view is secondary. The frames of the primary view and the frames of the secondary view are split into a primary bit-stream and a secondary bit stream by Bit Stream Splitter BSS. The coding system comprises a multiplexer MUX which assigns a code, e.g. 0x01 for MPEG or 0x1B for H.264, recognizable for standard video as a video bitstream, to the primary bitstream and a different code, e.g. 0x20, to the secondary stream. The multiplexed signal is transmitted (T). In FIG. 3A the signal is received by a decoding system in accordance with the invention. The demultiplexer recognizes the two bitstreams 0x01 or 0x1B (for the primary stream) and 0x20 (for the secondary stream) and sends them both to a Bit Stream Merger (BSM) which merges the primary and secondary stream again and the combined video sequence is decoded by reversing the encoding method in a decoder. The decoding system 8 in combination with a 3D display device forms an example of a display device in accordance with the invention.

FIG. 3B illustrates the situation when the multiplexed signal is received by a standard video system 9. The standard demultiplexer recognizes the bitstream 0x01 or 0x1B as a video data signal and transmits it to the standard decoder. The bitstream 0x20 is not recognizes and rejected, in FIG. 3B schematically indicated by sending the bitstream to the waste basket WB. The signal received by the decoder has a bitrate the standard decoder can handle and is in a form the standard decoder can manage.

Because the primary stream 0x1B is a fully self-contained signal, the problem associated with the method of FIG. 2 does not occur when a standard 2D video system displays the view of the primary signal. Thus the method of FIG. 3 is 2D backward compatible.

The method of encoding of the invention allows a reduction of bit rate compared to compressing the two views separately. Thus both a reduction in bitrate as well as 2D backward compatibility are achieved.

Figure 4:
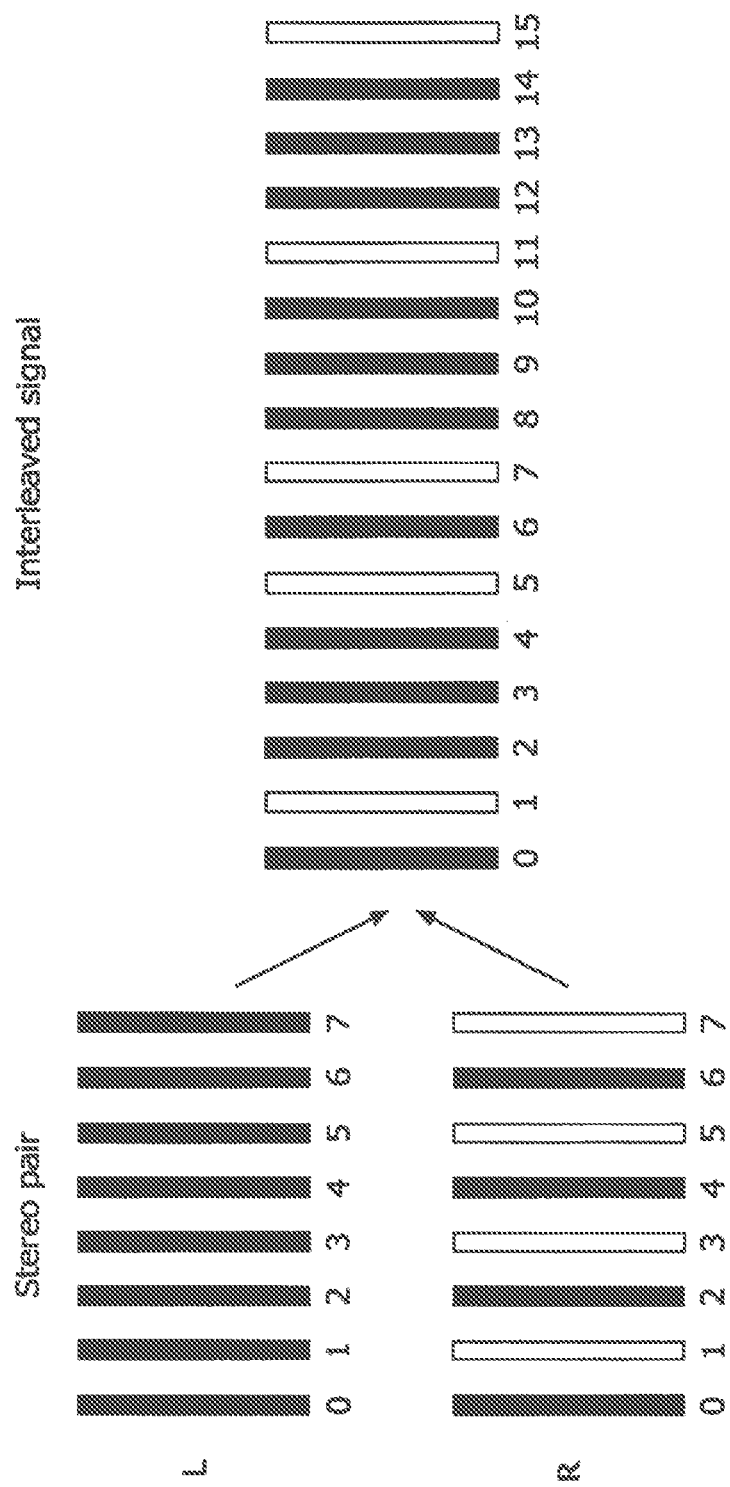
FIG. 4 illustrates interleaving of two views, left (L) and right (R).

FIG. 4 illustrates interleaving of two views, left (L) and right (R), each comprised of frames 0 to 7 into an interleaved combined signal having frames 0 to 15. Interleaving of signal is a well known process in image processes.

Figure 5:
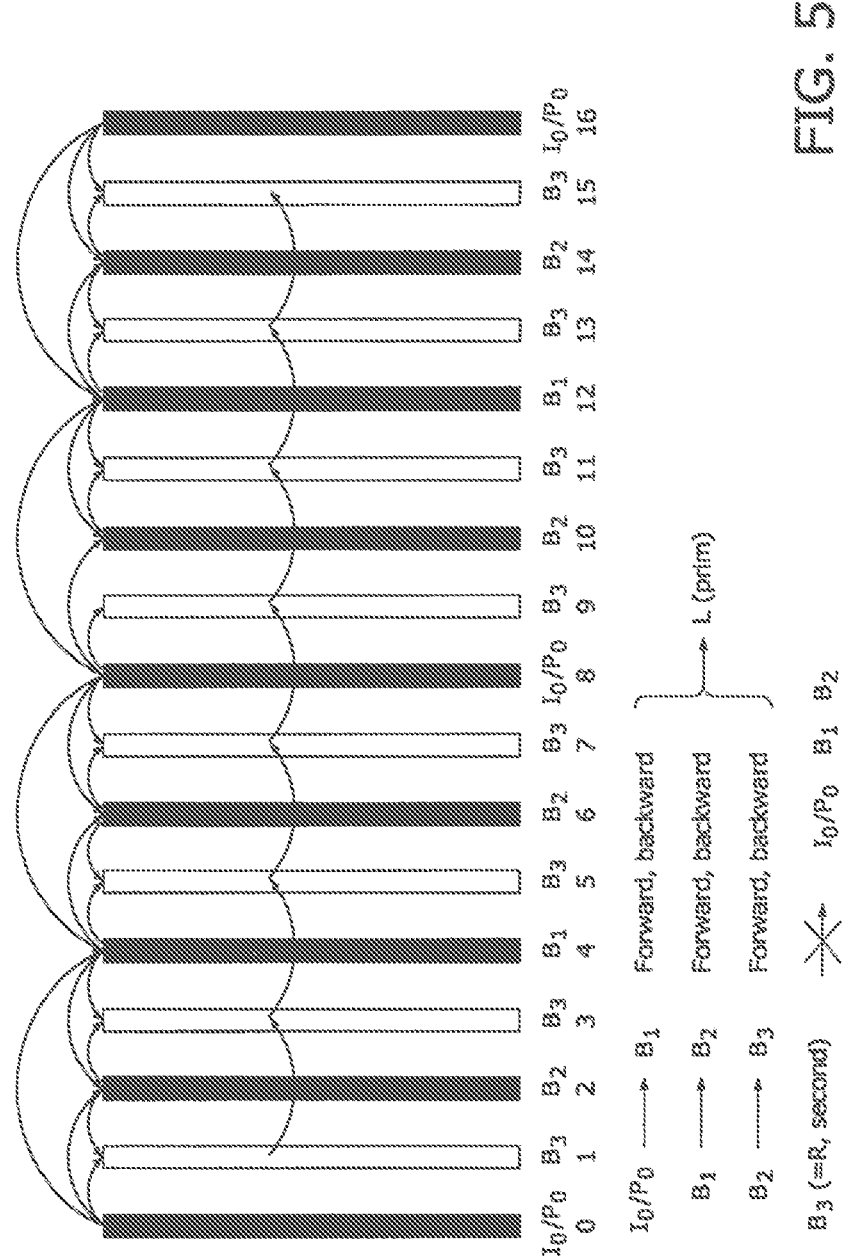
FIG. 5 illustrates a so-called dyadic temporal structure using hierarchical B frames.

FIG. 5 illustrates a so-called dyadic temporal structure using hierarchical B frames. In normal video processing uses is often made of different types of frames I frames B and P frames. Some frames need other frames for encoding. In the scheme depicted in FIG. 5 it is indicated by means of arrows which frames are used in encoding and compressing of other frames. In these schemes $I_0/P_0$ frames are used in encoding/compression $B_1$ frames, $B_1$ frames are used in encoding/compressing $B_2$ frames and $B_2$ frames are used in encoding/compressing $B_3$ frames. Thus there is a hierarchy, wherein the lowest levels of hierarchy are the $B_3$ frames. The $B_3$ frames need higher level hierarchy frames ($I_0/P_0$, $B_1$, $B_2$) to be encoded (or at the receiver end be decoded) but are themselves not needed to encode or decode higher level hierarchy frames.

When the interleaving scheme of FIG. 4 is combined with the dependency scheme of FIG. 5, it becomes apparent that the frames of one of the views (either left or right view) correspond with the frames on the $B_3$ level of hierarchy, and the frames of the other views with the higher level of hierarchy. This view does not need frames of the other view to be decoded and is thus a self-contained signal. In FIG. 5 this corresponds to the fact that no arrows go from a $B_3$ frame to any $B_2$, $B_1$ or $I_0/P_0$ frame. The frames for the other view ($B_3$) do not form a self-contained signal, said view needs information of the self-contained view to be decoded. The $B_3$ frames may be interdependent.

By interleaving the frames of the left and right view and then compressing then with a compression scheme which provides for one self-contained signal for one of the views and then splitting the signal again in a primary bit stream (containing the self-contained signal) and a secondary bit-stream (containing the non-self-contained signal) a bit rate reduction is achieved while yet providing a fully operational 2D backward compatible signal. The bit stream splitter creates the primary stream (0x1B) by concatenating all the Access Units (an Access Units comprises the data for at least a frame) of the first view into a primary stream and creates a secondary stream by concatenating all the Access Units (AU) of the second view into the secondary bit stream. The multiplexer then assigns a different code to the primary and secondary stream.

Figure 6:
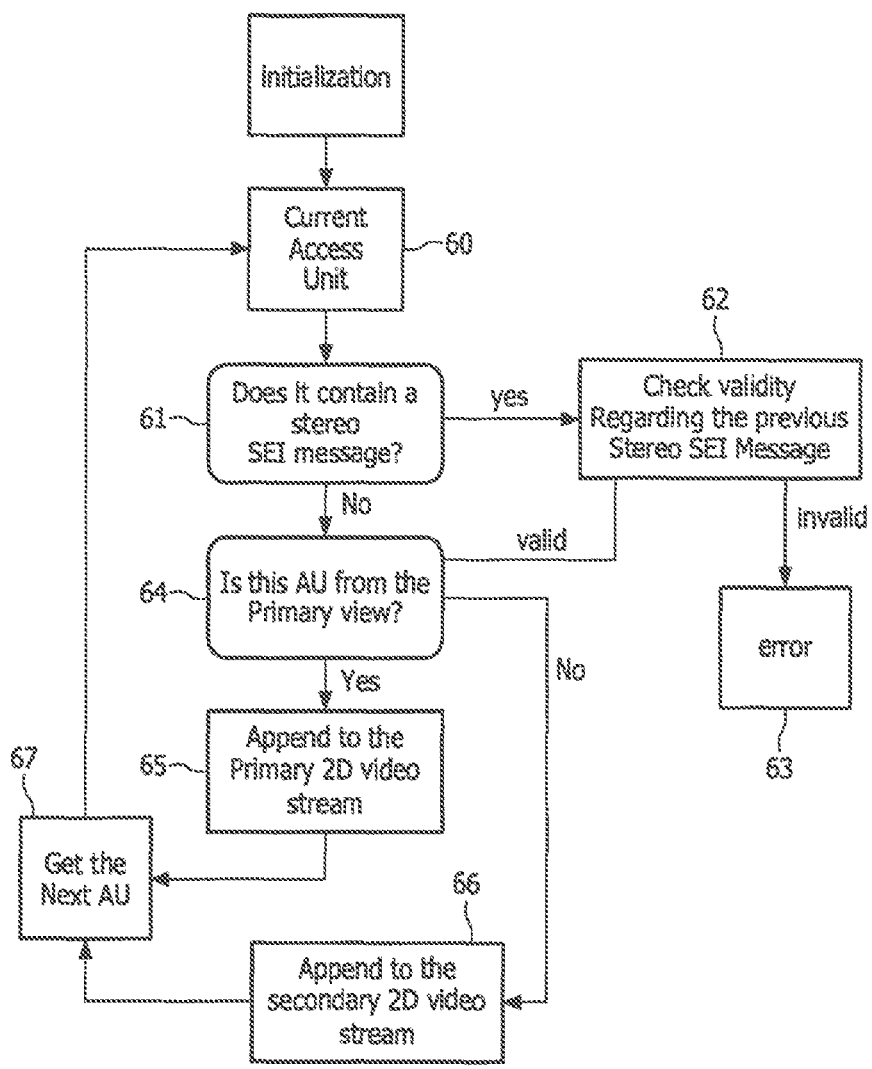
FIG. 6 illustrates a diagram for a bit stream splitter.

FIG. 6 illustrates an exemplary diagram for a bit stream splitter. This provides a bit-stream splitting mechanism compatible with an AVC (Advanced Video Coding) coding scheme. In an AVC coding scheme SEI message can be given. A "Stereo Video Information" SEI message contain information on the performed interleaving so that a stereo decoder at the receiving end is able to distinguish one view from another and perform de-interleaving.

In this embodiment of the invention the SEI message is used inside the encoding system.

An access unit is taken in step 60.

In a first step 61 it is checked whether the current access unit comprises an SEI message.

If an access unit does not contain an SEI message, in this particular example the information on the set of frames to which the access unit belongs is deduced from previous received information. For instance, if the previous received information was: "if one access unit belongs to set A, the next belongs to set B", it is not needed to provide each access unit with SEI information.

If the access unit does contain an SEI message the validity of the SEI message is checked with regards to a previous SEI message in step 62.

The SEI messages give information on interleaving which usually is a known sequence. If the SEI message is invalid there is an error 63.

If the SEI message is valid, the next step 64 is taken.

For each access unit the relevant interleaving information is now available, either by means of the fact that there was no SEI message, in which case there was no change in SEI message with respect to a previous access unit, or the access unit has a valid SEI message.

Figure 7:
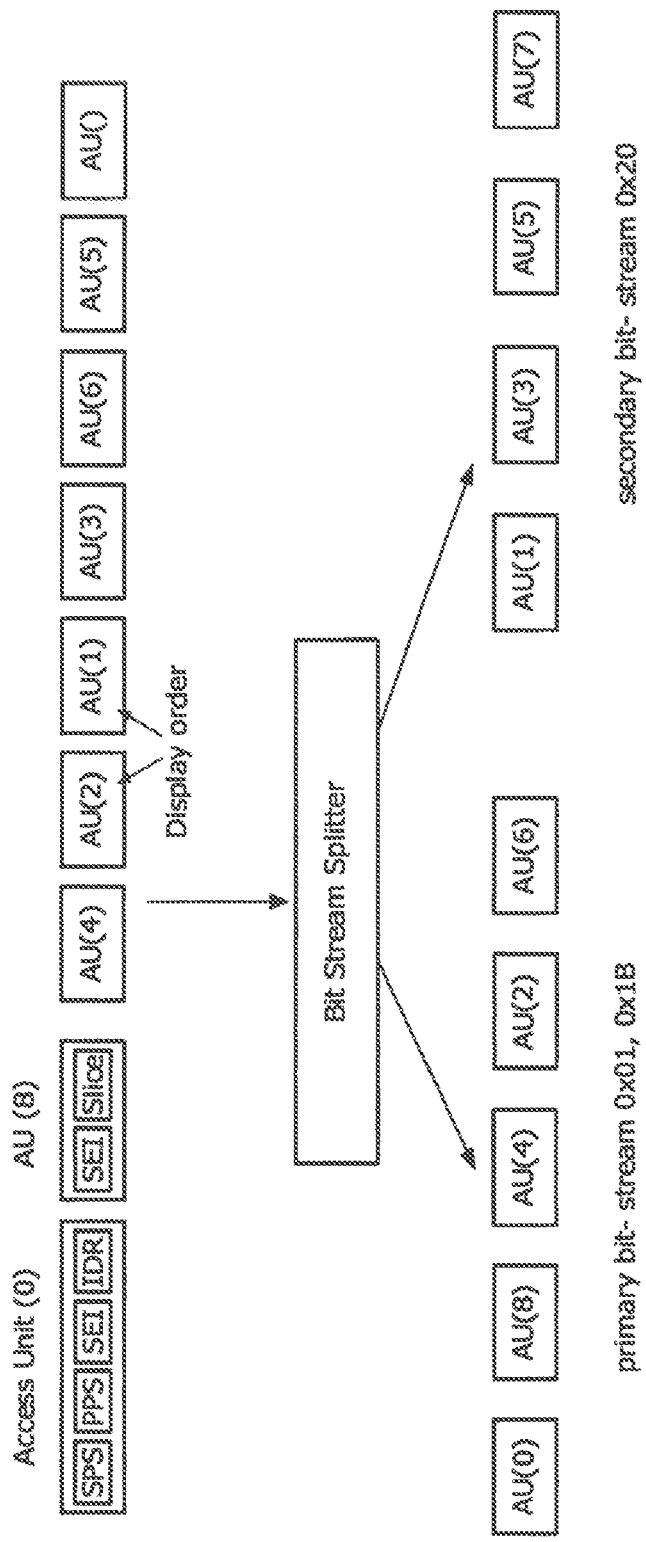
FIG. 7 illustrates an example of a single encoded bit stream and its split version.

In the next step 64 it is checked whether the Access Unit forms part of the primary view, if so it is appended in step 65 to the primary view bit stream, if not, it is appended to the secondary view video bit-stream in step 66. It is obvious that this sequence could be reversed. Once an access unit is dealt with and appended to either the primary or secondary bit-stream, the next access unit is gotten in step 67 and the process is repeated. It is remarked that FIG. 6 is an exemplary embodiment of a splitter. In various ways the encoded signal may be split. The information on splitting could be implicit, for instance if a fixed sequence is used for encoding, or explicit, for instance by using SEI messages of NAL codes or a mixture thereof. The various abbreviations in the access unit 0 and 8, although not of relevance for the present invention, except for the SEI abbreviation, stand for:

SPS: Sequence Parameter Set
PPS: Picture Parameter Set
IDR: Instantaneous Decoder Refresh
Slice: Group of MB (macroblock 16*16 pixels)
SEI: Supplemental Enhancement Information FIG. 7 illustrates an example of a single encoded bit stream and its split version. It is to be noted that the access units 0 and 8 which comprise the video information are made part of the primary bit-stream. All access units for the primary bitstream (AU8, AU0, AU4, AU2, AU6) have an SEI message corresponding to one of the streams, the self-contained signal, the other access units have an SEI message pertaining to the secondary bitstream.

The two bit-streams are kept synchronous at systems level, for instance thanks to DTS (Decoding Time Stamp)

flags in an MPEG-2 transport stream (broadcast application) or in an MPEG-4 File Format (file storage applications). A syntax element at systems level may be used to indicate that the secondary bit stream is dependent on the primary bit stream.

It is remarked that the secondary stream is no longer a valid stream by itself. Often this will not be a problem, Should problem occur one can insert empty frames into the secondary stream which will hardly increase the bit rate. Before the merging process these empty frames will have to be removed first.

In embodiments regular changes of primary and secondary signal may be made. In the method the two views are not treated equally; the first view is a self-contained view, whereas the second view is derived from the first. This could lead to a small difference in quality between the left end right view which may, in time, lead to slightly different behavior of the left and right eye receiving the images. By regularly changing the primary view from left to right, for instance at scene changes, this can be avoided.

In embodiments the quantization factor of the compression may differ for the primary and secondary bit streams, in the 3D example the primary and secondary views. Especially when there are more secondary views, as will be explained below, it may be useful to assign more bandwidth to the primary view than to the secondary view.

Figure 8:
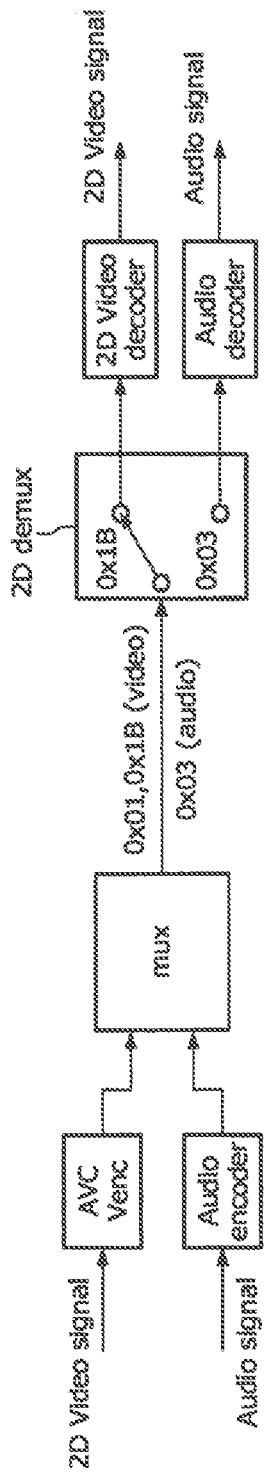
FIGS. 8, 9 and 10 illustrate the prior art techniques and the invention.
Figure 9:
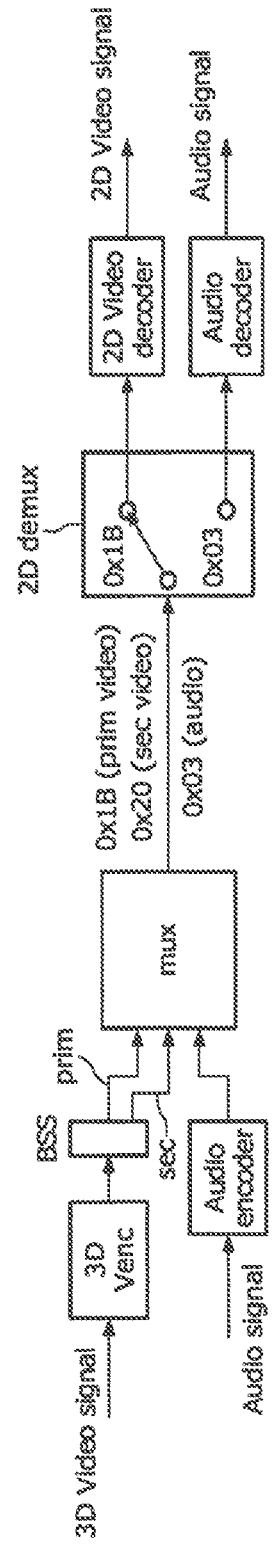
Figure 10:
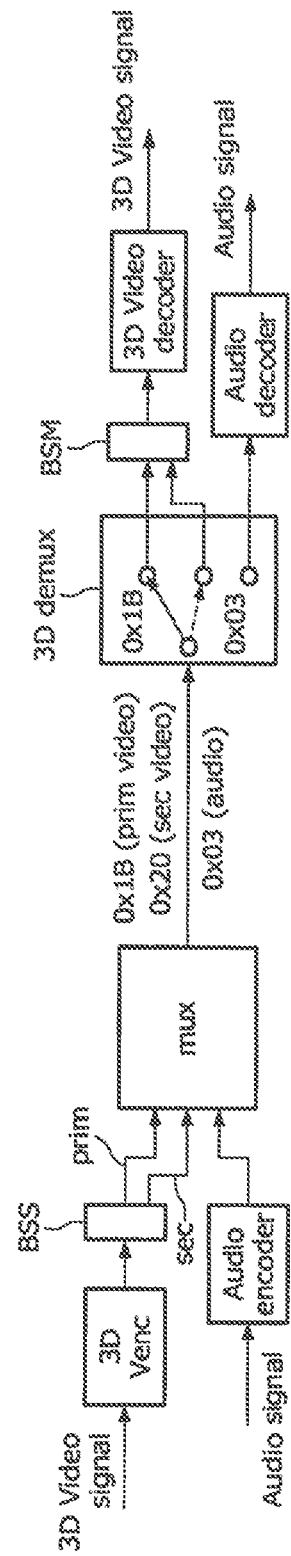

FIGS. 8 to 10 illustrate schematically the prior art and the invention. In the prior art, see FIG. 8, a video encoder, in this example the AVC (Advanced Video coding) video encoder Venc encodes a video data signal, an audio encoder encodes an audio signal. The multiplexer MUX generates a multiplexed signal wherein the video bitstream gets a code e.g. 0x1B and the audio bitstream a code 0x03. The 2D demultiplexer 2D demux extracts from the multiplexed signal the two composing bitstreams and send the video bitstream to a video decoder and the audio bitstream to an audio decoder. The video decoder thus gets the whole of the video bitstream whether it can handle it or not.

FIG. 9 illustrates the situation when use is made of the method of encoding and the encoding system of the invention at the encoding side, and a standard video device at the decoding side.

After encoding the splitter splits the encoded stream into a primary stream prim and a secondary stream sec. The multiplexer mux generates a multiplexed signal comprising a bitstream 0x1B for the primary view, and a separate bitstream 0x20 for the secondary view and, as in the case of FIG. 8, an audio bitstream 0x03.

The standard device comprises a demultiplexer which extracts form the multiplexed signal the primary bitstream 0x1B since it recognizes this bitstream by its code; it rejects the bitstream 0x20. The video decoder receives the primary bitstream 0x1B. Since this is a self-contained bitstream with a "normal" bit rate, the video decoder is able to decode the bitstream without great difficulty. Thus the encoding method and system is backward compatible.

FIG. 10 illustrates a situation wherein use is made of a decoding system in accordance with the invention.

At the decoder side, the decoder comprises a 3D demultiplexer 3D demux. This demultiplexer sends the audio bitstream 0x03 to an audio decoder, extracts the two video bitstreams 0x1B (the primary bitstream) and 0x02 (the secondary bitstream) from the multiplexed signal and sends the two video bitstreams to their respective inputs at a Bit Stream Merger (BSM) which merges the primary and secondary stream again. The merged video stream is send to a decoder which decodes the merged bitstream using a reverse coding method providing a 3D video data signal.

Thus, a specialized 3D video decoding system is able to decode a 3D video data signal, while yet a standard 2D video decoding system is also able to provide a high quality image.

In the examples given above the enhanced video data signal was a 3D signal comprising two views, a left and a right view.

The invention is not restricted to this situation, although it is highly suitable for this situation.

The invention is also useful when, instead of two views, a multiview signal is generated.

Figure 11:
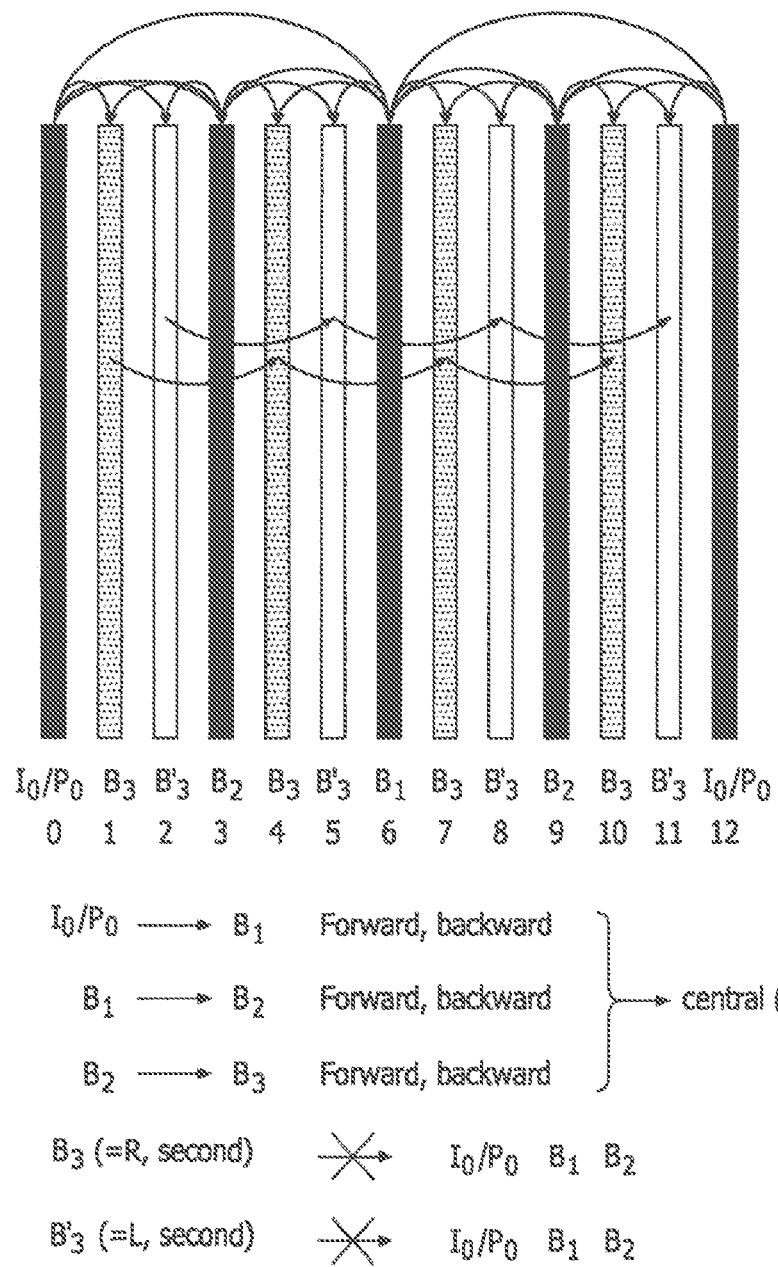
FIG. 11 illustrates a situation in which there are three interleaved view signals.

FIG. 11 illustrates a situation in which there are three interleaved view signals, a first central view for which the bitstream is self-contained, comparable to the self-contained L view bitstream in FIG. 5, and two secondary view bitstreams $B_3$ and $B_3'$, each of which bit-streams is encoded and compressed in dependence on the central view data.

In this example three are three views, a primary view, for instance a central view, and a number of secondary views, for instance a left and a right view. For the central view a self-contained bitstream is generated. For the two secondary views, for instance a left and right view, secondary, not self-contained, bit streams are generated.

In this embodiment it may be useful to use in the compression a different quantization factor for the central view frames than for the secondary view frames especially if there are many secondary views.

This embodiment is useful for generation of multiview signal using a MVC (multi-View encoding) encoder. In the example of FIG. 11 three views, a single primary and two secondary views are generated. More than two secondary views may be generated depending on the multiplicity of views being generated. In complex embodiments more than one primary view and more secondary views may be generated.

Figure 12:
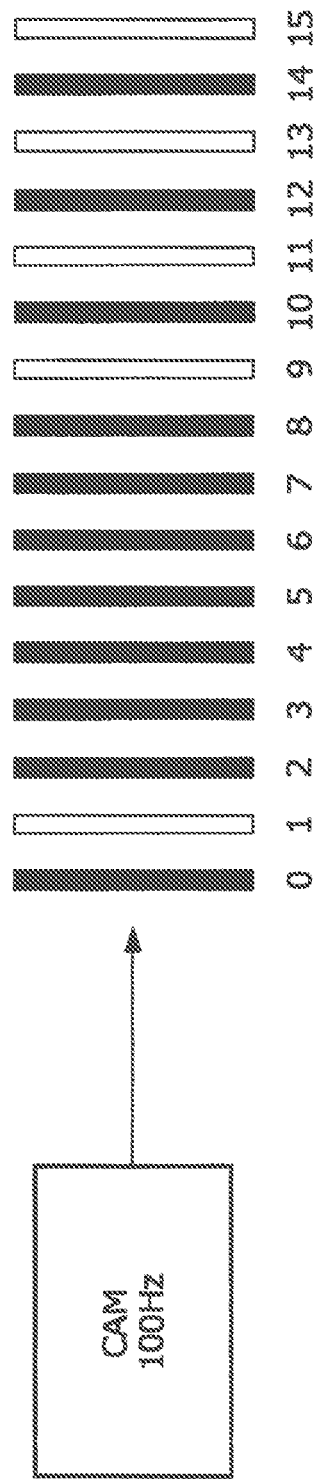
FIGS. 12, 13, 14A and 14B illustrate an embodiment of the invention for high frequency video.

A further embodiment of the invention is exemplified in FIG. 12.

Another category of enhanced video data signals in one in which a higher frequency (for instance 100 Hz) signal is to be generated. The problem described above for stereo signals play also for such video data signal. The majority of video display devices operates at standard frequencies and the decoders are designed for such frequencies.

FIG. 12 illustrates a signal that is produced by a high speed camera CAM 100 Hz comprises a large number of frames at a 100 Hz frame rate. Such a signal is not suitable for display in standard 50 Hz TV systems. It may be thought of comprising a normal frame distribution and a high speed frame distribution.

Figure 13:
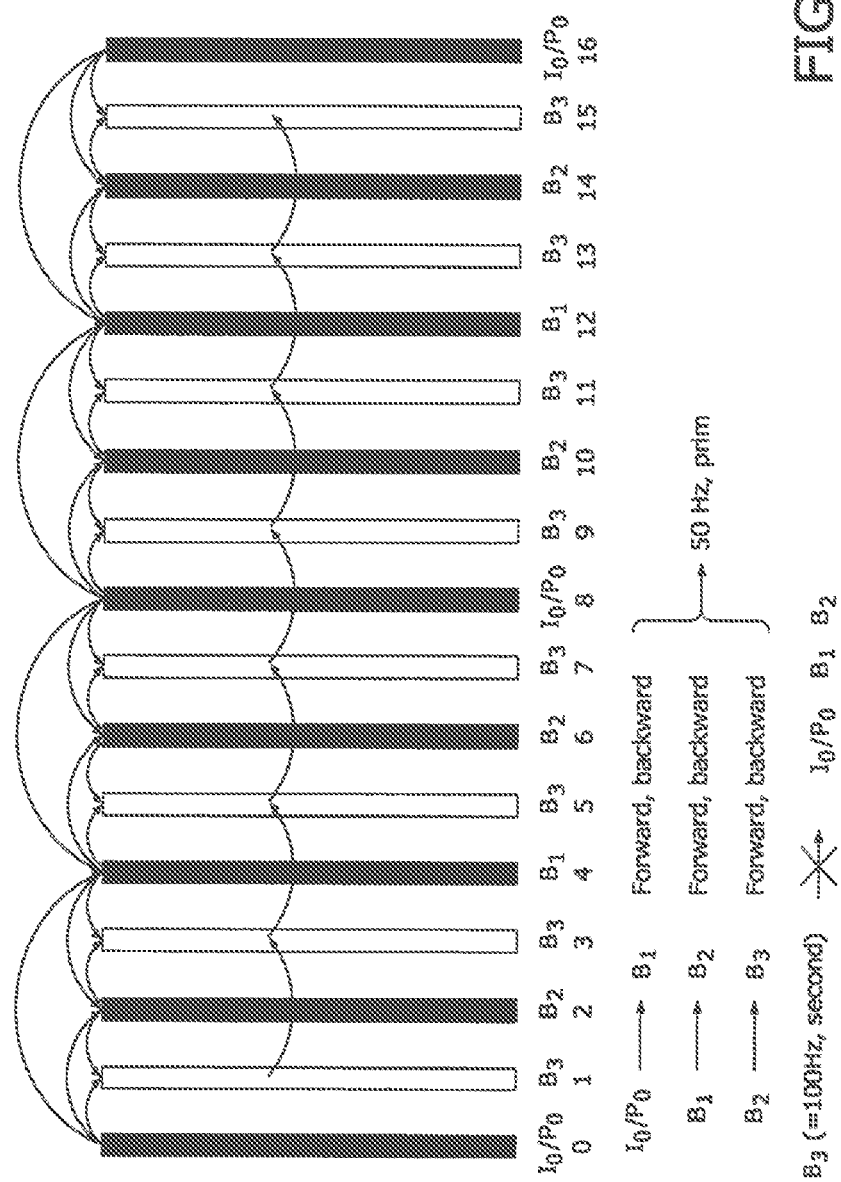

In a specialized video decoder the frames may be compressed in a scheme much the same as the scheme shown in FIG. 5. This is shown in FIG. 13. The signal originating from the high speed camera may be seen as providing an signal of two sets of interleaved frames (namely the odd and even numbered) and these two are compressed wherein the even numbered frames are compressed to form a self-contained set of frames at 50 Hz frequency, the odd numbered frames are compressed in dependence of the set of even numbered frames. This example is in so far different from the previous example in that the interleaving of the sets frames is inherent in the signal that is provided to the encoder. However, the sample principles apply. The even frames will form the primary bit-stream, the odd frames the secondary bitstream or vice versa. Of course when an even higher frequency signal is provided for instance because a 200 Hz camera is used, the number of sets could be made four, wherein a single primary 50 Hz bit-stream is generated and three secondary bit-streams.

Figure 14A:
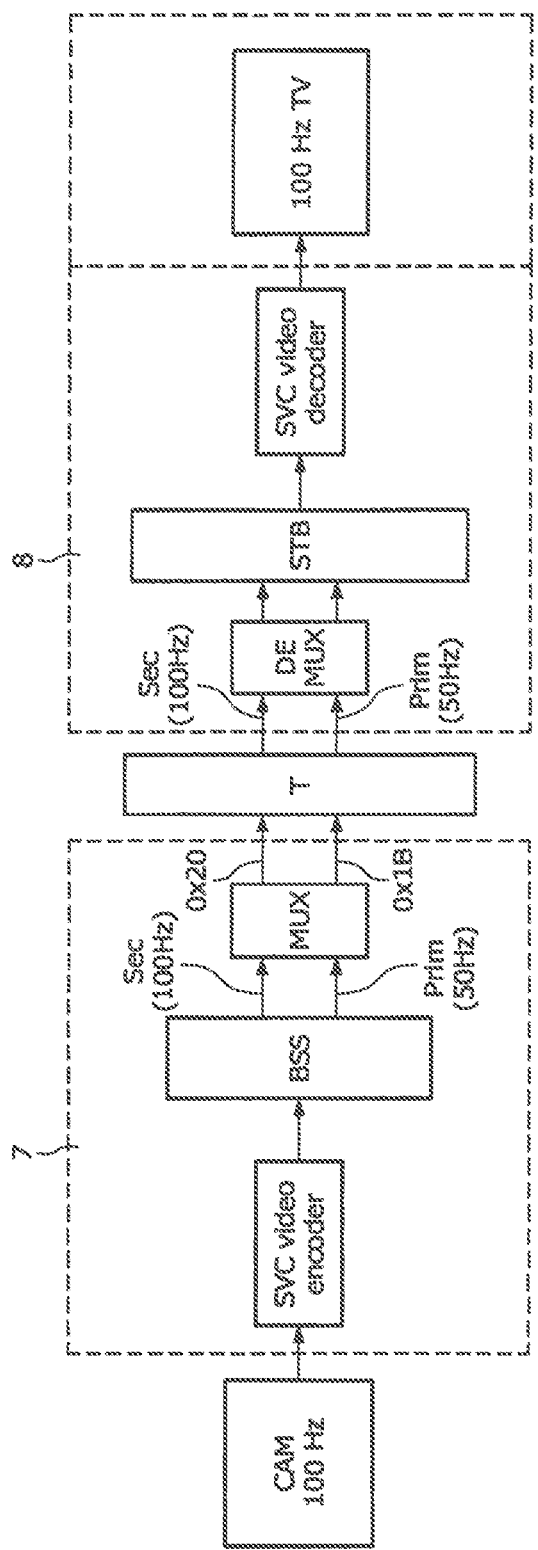
Figure 14B:
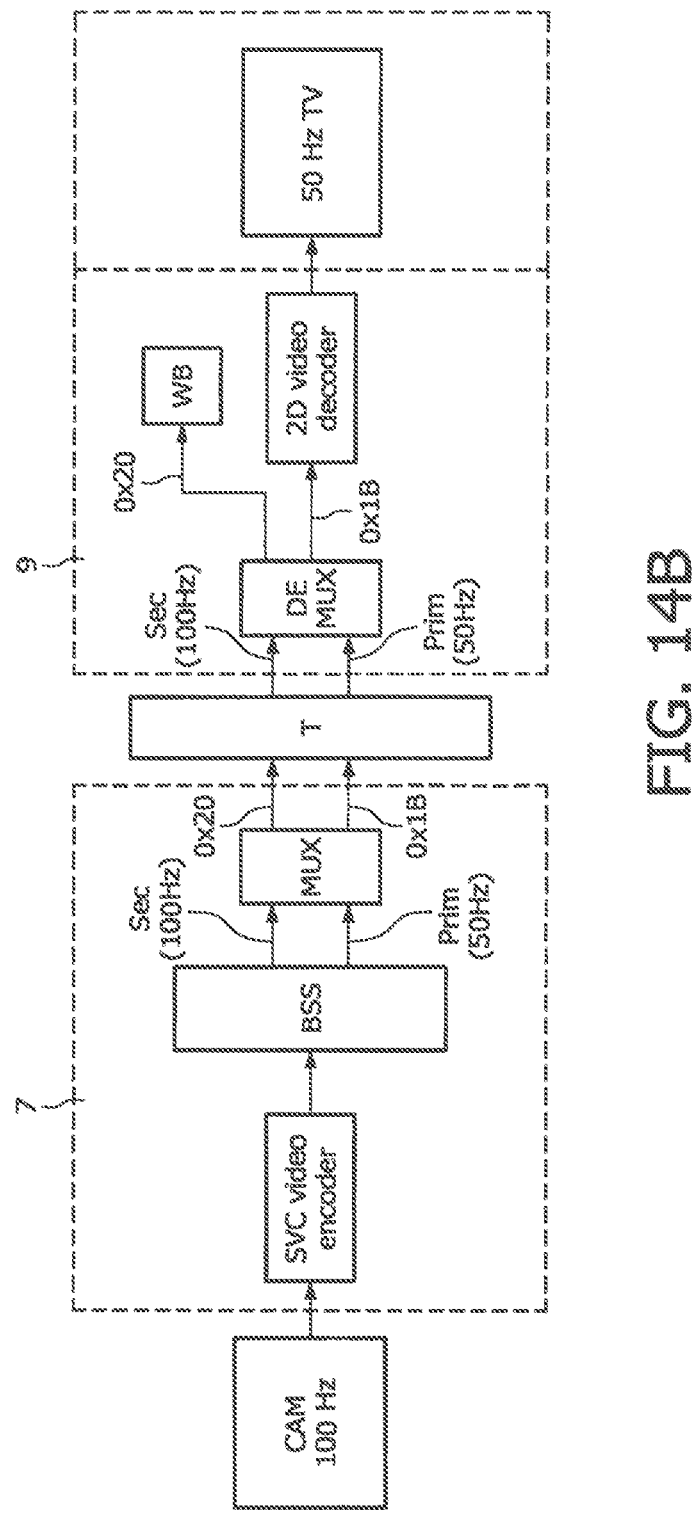

FIGS. 14A and 14B show encoding and decoding schemes for the embodiment schematically shown in FIGS. 12 and 13. These schemes are in large part similar to the schemes of FIGS. 3A and 3B. In FIG. 14A a situation is schematically indicated wherein a specialized decoder is used. A 100 Hz camera CAM 100 Hz provides a signal as schematically shown in FIG. 12, in an SVC (Scalable Video Coding) encoder an encoding scheme as schematically shown in FIG. 13 is performed. The camera thus provides an interleaved (namely even and odd frames with 100 Hz) signal, which is received by the encoding system 7, the encoding system 7 comprising an encoder for compressing one of the sets comprised in the interleaved signal provided by the 100 Hz camera into a self-contained set of compressed frames. In the splitter BSS the frames are appended to either a primary bitstream 0x1B or a secondary bitstream 0x20 and in the multiplexer the two bitstreams are given a differing codes. The reverse is done at the decoder 8 side. STB stands for Set Top Box. The final decoded signal is fed to a 100 Hz TV. A display device according to this embodiment of the invention comprises decoding system 8 and a 100 Hz TV. A recording device in accordance with this embodiment of the invention comprises encoder 7 and a camera.

FIG. 14B illustrates the situation when a 50 Hz TV with a corresponding conventional decoding system is used. The standard demultiplexer will recognize and accept the primary bitstream and send it onward towards the 50 Hz TV. This bitstream is self-contained and has the proper format and frequency and will provide an adequate image quality on the 50 Hz TV. The secondary bitstream is rejected and does not interfere with the normal operation of the 50 Hz TV system.

In the above embodiment the SVC stream is split along the frequency (time axis). SVC also allows splitting frames along the resolution and/or the quantization axis (SNR, CGS (coarse Grain scalability), FGS (Fine grain scalability)) and/or color sampling axis (4:4:4,4:2:0,4:2:2). In such embodiments the problem described above i.e. the fact that a standard video decoder has problems handling the incoming bitstream also occur, in other words compatibility problems occur.

Within the framework of the invention, in its broadest sense, the video stream is split into at least two bit streams, a primary and secondary video stream (see FIG. 15), wherein the primary video stream is self-contained and the secondary video stream need the primary video stream for decoding, and in a multiplexer the primary video stream is provided with a standard code (0x1B) and the secondary video stream is provided with a differing code (0x20). The video data signal may be split along the resolution axis wherein the primary bit stream in the multiplexed signal comprises the data for a base layer, and the secondary bit stream in the multiplexed signal which is provided with a different code comprises the video data for an enhancement layer or enhancement layers.

Figure 16B:
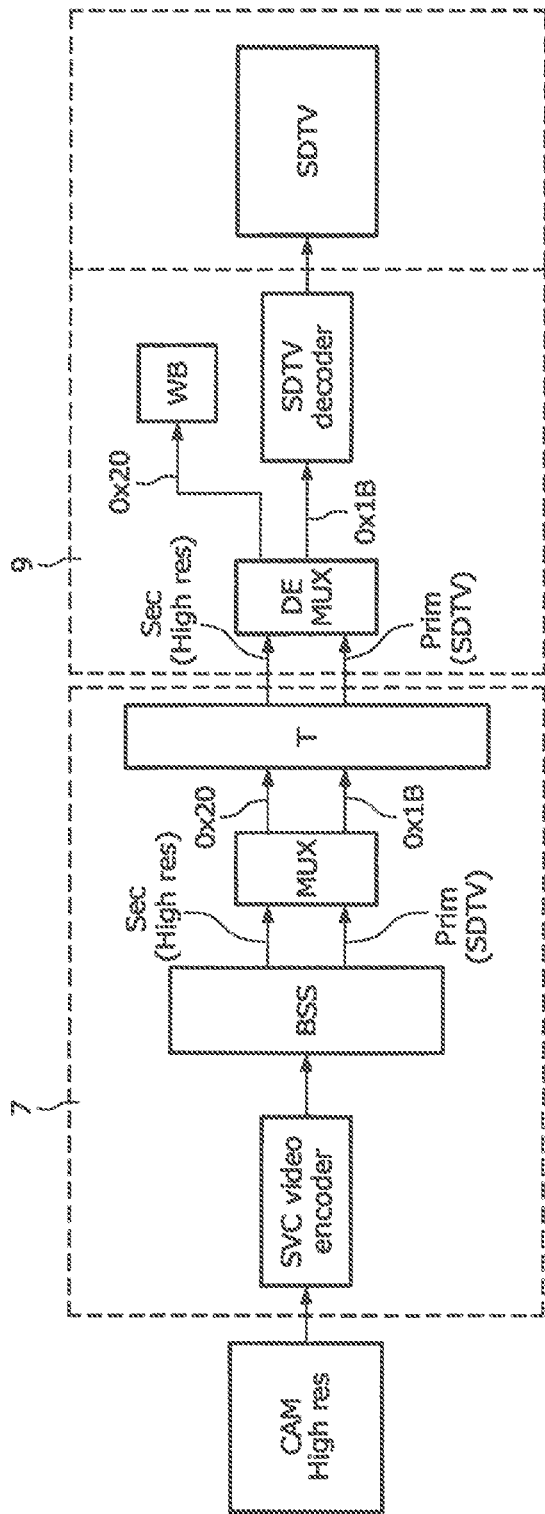

The code provided to the primary stream is a standard code (e.g. 0x1B or 0x01) and is thus decidable by any normal standard non-scalable MPEG (for 0x01) or H.264 video decoder (for 0x1B) 9, whereas a specialized decoder 8 in accordance with the invention can draw full advantage of the scalability encoding. FIG. 16A and FIG. 16B provide an embodiment of the invention which can be applied to supply an SDTV video data signal to an SDTV (standard definition TV) as shown in FIG. 16B and an HDTV video data signal to a HDTV (High Definition TV) as shown in FIG. 16A.

The invention is also embodied in any computer program product for a method or device in accordance with the invention. Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

The invention also relates to devices comprising an encoding system in accordance with the invention, such as 3D video recording devices or high resolution video recording devices.

The invention also relates to display devices comprising a decoding system in accordance with the invention. Such devices may for instance be 3D video display devices or HDTV display device or display devices with increased resolution.

The invention furthermore relates to a multiplexed video data signal comprising at least two related video data signals with separate codes (0x01, 0x1B, 0x20), wherein a first video data signal (0x01, 0x1B) is a self-contained video data signal and at least a second video data signal (0x20) is not. Using a demultiplexer it is easy to treat the two related, but different, video data signals differently without having to use a decoder to make the distinction. For standard devices, such as standard 2D video display devices or SDTV device, the first selfcontained signal can be forwarded to the decoder, without overloading the decoder with the second signal. Specialized video system can make full use of the data in the two video data signals.

In short the invention can be described as follows:

Video data signals are encoded such that the encoded video data signal comprises at least a primary and at least a secondary video data signal. The primary and secondary video data signal are jointly compressed. The primary video data signal is compressed in a self-contained manner, and the secondary video data signal is compressed using data from the primary video data signal. The jointly compressed video data signal is split into separate bitstreams, at least a primary bitstream comprising data for the primary video data signal and at least a secondary bitstream comprising data for the secondary video data signal, whereafter the primary and secondary bitstreams are multiplexed into a multiplexed signal, and the primary and secondary signals are provided with separate codes.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

The word "comprising" does not exclude the presence of other elements or steps than those listed in a claim. The invention may be implemented by any combination of features of various different preferred embodiments as described above.

The invention claimed is:

1. A method of decoding a video signals, the method comprising act of:
receiving a first bitstream having a first code and a second bitstream having a second code which is different from the first code, the first bitstream and the second bitstream having been split from a coded signal of a combined signal formed by interleaving frames of first and second signals, wherein the first signal has been encoded in a self-contained and the second signal has been encoded using the frames of the first signal;
demultiplexing the first bitstream and the second bitstream into primary and secondary video signals;
merging by a merger the primary and secondary video signals into a merged signal;
providing the merged signal by the merger to a decoder; and
decompressing by the decoder the merged signal such that in decompression of the primary video signal only data from the primary video signal is used, and in decompression of the secondary video signal, data of the primary video signal is used.

2. The method of claim 1, wherein the merged signal includes a plurality of interleaved frames, and after decompressing the frames are de-interleaved to provide two or more views to a display.

3. The method of claim 1, wherein the primary and secondary video signals form a left view and a right view provided to a display.

4. The method of claim 3, wherein the left and right views each include more than one view of a multi-view image.

5. The method of claim 1, wherein the primary video signal comprises data on a base layer and the secondary video signal comprises data on an enhancement layer.

6. A system for decoding video signals, the system comprising:
a receiver configured to receive a first bitstream having a first code and a second bitstream having a second code which is different from the first code, the first bitstream and the second bitstream having been split from a coded signal of a combined signal formed by interleaving frames of first and second signals, wherein the first signal has been encoded in a self-contained and the second signal has been encoded using the frames of the first signal;
a demultiplexer configured to demultiplex the first bitstream and the second bitstream into primary and secondary video signals;
a merger configured to merge the primary and secondary video signals into a merged signal; and
a decoder connected to the merger to receive the merged and configured to decompress the merged signal such that in decompression of the primary video signal only data from the primary video signal is used, and in decompression of the secondary video signal, data of the primary video signal is used.

7. The system of claim 6, wherein the merged signal forms an interleaved plurality of frames and the system further comprises a de-interleaves configured to de-interleave, after decompressing, the interleaved plurality of frames to provide two or more views.

8. The system of in claim 6, further comprising a display device for displaying the two or more views.

9. A non-transitory computer readable medium comprising computer instructions which, when executed by a processor, configure the processor to perform a method of decoding video signals, the method comprising acts of:
receiving a first bitstream having a first code and a second bitstream having a second code which is different from the first code, the first bitstream and the second bitstream having been split from a coded signal of a combined signal formed by interleaving frames of first and second signals, wherein the first signal has been encoded in a self-contained and the second signal has been encoded using the frames of the first signal;
demultiplexing the first bitstream and the second bitstream into primary and secondary video signals;
merging by a merger the primary and secondary video signals into a merged signal; and
decompressing by a decoder the merged signal such that in decompression of the primary video signal only data from the primary video signal is used, and in decompression of the secondary video signal, data of the primary video signal is used.

10. The non-transitory computer readable medium of claim 9, wherein the merged signal includes a plurality of interleaved frames, and after decompressing the frames are de-interleaved to provide two or more views.

11. The non-transitory computer readable medium of claim 9, wherein the primary and secondary video signals form a left and a right view.

12. The non-transitory computer readable medium of claim 11, wherein the left and right views each include more than one view of a multi-view image.

13. The non-transitory computer readable medium of claim 9, wherein the primary video signal comprises data on a base layer and the secondary video signal comprises data on an enhancement layer.

* * * * *